(12) United States Patent
Sunila

(10) Patent No.: US 12,185,126 B2
(45) Date of Patent: Dec. 31, 2024

(54) ANTENNA TILTING

(71) Applicant: Elisa Oyj, Helsinki (FI)

(72) Inventor: Karri Sunila, Helsinki (FI)

(73) Assignee: Elisa Oyj, Helsinki (FI)

( * ) Notice: Subject to any disclaimer, the term of this patent is extended or adjusted under 35 U.S.C. 154(b) by 356 days.

(21) Appl. No.: 17/765,635

(22) PCT Filed: Sep. 16, 2020

(86) PCT No.: PCT/FI2020/050589
§ 371 (c)(1),
(2) Date: Mar. 31, 2022

(87) PCT Pub. No.: WO2021/064282
PCT Pub. Date: Apr. 8, 2021

(65) Prior Publication Data
US 2022/0369128 A1 Nov. 17, 2022

(30) Foreign Application Priority Data
Oct. 3, 2019 (FI) .................................. 20195841

(51) Int. Cl.
*G06F 3/12* (2006.01)
*H04W 16/28* (2009.01)
*H04W 36/00* (2009.01)
(52) U.S. Cl.
CPC ....... *H04W 16/28* (2013.01); *H04W 36/0085* (2018.08)
(58) Field of Classification Search
None
See application file for complete search history.

(56) References Cited

U.S. PATENT DOCUMENTS

| | | | |
|---|---|---|---|
| 6,549,529 B1* | 4/2003 | Drabeck | H01Q 3/26 370/347 |
| 9,113,353 B1 | 8/2015 | Cotanis et al. | |
| 9,986,443 B1 | 5/2018 | Nolan | |
| 2014/0169160 A1 | 6/2014 | Sridhar et al. | |
| 2016/0135067 A1 | 5/2016 | Morad et al. | |
| 2016/0165472 A1* | 6/2016 | Gopalakrishnan | H04W 24/10 455/67.11 |

(Continued)

FOREIGN PATENT DOCUMENTS

GB 2378858 A 2/2003

OTHER PUBLICATIONS

Finnish Patent and Registration Office, Search Report, Application No. 20195841, mailed Mar. 23, 2020, 2 pages.

(Continued)

*Primary Examiner* — Frantz Bataille
(74) *Attorney, Agent, or Firm* — Ziegler IP Law Group LLC

(57) ABSTRACT

A computer implemented method of antenna tilt analysis for a cell of a communication network. The method is performed by collecting performance data from the cell, determining number of bad coverage samples based on the performance data, determining value for a handover overlap parameter based on the performance data, detecting that the number of bad coverage samples and the value of the handover overlap parameter fulfil predetermined criteria, and responsively outputting instructions to change antenna tilt in the cell.

20 Claims, 3 Drawing Sheets

(56) References Cited

U.S. PATENT DOCUMENTS

2017/0026852 A1 1/2017 Jaldén et al.
2019/0166510 A1 5/2019 Venkatraman et al.
2019/0261197 A1 8/2019 Bellamkonda et al.

OTHER PUBLICATIONS

The International Search Report and Written Opinion, European Patent Office, Application No. PCT/FI2020/050589, mailed Nov. 26, 2020, 15 pages.
Unknown Author, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11)" 3GPP Standard; Technical Specification; 3GPP TS 32.522, 3rd Generation Partnership Project (3GPP), Mobile Competence Centre; Sophia-Antipolis Cedex; France, vol. SA WG5, No. V11.7.0, Sep. 19, 2013, http://www.3gpp.org, 58 pages.

* cited by examiner

ANTENNA TILTING

TECHNICAL FIELD

The aspects of the disclosed embodiments generally relate to antenna tilt analysis and antenna tilting in communication networks.

BACKGROUND

This section illustrates useful background information without admission of any technique described herein representative of the state of the art.

Communication networks comprise a plurality of cells serving users of the network. When users of the communication network move in the area of the network, connections of the users are seamlessly handed over between cells of the network. Dominance area is a physical area in which certain cell has a strongest signal level. The cell serves users in the dominance area. In the border of the dominance area, signal level of a neighbor cell becomes stronger and the users are handed over to the neighbor cell.

Cells should provide sufficient signal level in the dominance area, but signal level outside the dominance area should be minimized in order to minimize interference in neighboring cells. Signal level and dominance area can be adjusted by mechanically or electrically tilting base station antennas.

Now a new approach is provided for tilting antennas.

SUMMARY

Various aspects of examples of the disclosed embodiments are set out in the claims. Any devices and/or methods in the description and/or drawings which are not covered by the claims are examples useful for understanding the present disclosure.

According to a first example aspect of the present disclosure, there is provided a computer implemented method of antenna tilt analysis for a cell of a communication network. The method is performed by collecting performance data from the cell,
determining number of bad coverage samples based on the performance data,
determining value for a handover overlap parameter based on the performance data,
detecting that the number of bad coverage samples and the value of the handover overlap parameter fulfil predetermined criteria, and
responsively outputting instructions to change antenna tilt in the cell.

In an embodiment, the method further comprises
changing antenna tilt in the cell according to the instructions,
collecting updated performance data from the cell,
determining number of bad coverage samples based on the updated performance data,
determining value for the handover overlap parameter based on the updated performance data,
detecting that the number of bad coverage samples or the value of the handover overlap parameter do not fulfil predetermined criteria, and
reverting back to previous antenna tilt.

In an embodiment, detecting fulfillment of the predetermined criteria is based on detecting that the number of bad coverage samples indicated that the cell does not suffer from bad coverage and that the value of the handover overlap parameter indicates that the cell has overlapping handover area with at least one neighbor cell.

In an embodiment, detecting fulfillment of the predetermined criteria is based on comparison to one or more thresholds.

In an embodiment, a first threshold for the number of bad coverage samples is 40-80.

In an embodiment, the first threshold for the number of bad coverage samples is 70 for GSM technology and 50 for LTE technology.

In an embodiment, a second threshold for the value of handover overlap parameter is 85-95%.

In an embodiment, the second threshold for the value of handover overlap parameter is 87% for GSM technology and 93% for LTE technology.

In an embodiment, the antenna tilt analysis is performed individually for different cells.

In an embodiment, the method further comprises periodically repeating the antenna tilt analysis.

In an embodiment, the value of the handover overlap parameter is calculated based on number of samples in a first signal level range below and number of samples a second signal level range above a handover threshold signal level value.

In an embodiment, the value of the handover overlap parameter is difference between the number of samples in the first range and the number of samples in the second range. In an embodiment, the difference is expressed in percentage.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect of the present disclosure, there is provided a computer program comprising computer executable program code which when executed by a processor causes an apparatus to perform the method of the first aspect or any related embodiment.

The computer program of the third aspect may be a computer program product stored on a non-transitory memory medium.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the present disclosure. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

Example embodiments of the present disclosure and its potential advantages are understood by referring to FIGS. 1 through 4 of the drawings. In this document, like reference signs denote like parts or steps.

Example embodiments of the present disclosure provide mechanisms to determine how to tilt antennas in communication networks. A basic principle is to analyse performance data from individual cells without needing to perform complex interference calculations. According to an embodiment, it is determined that cells that do not suffer from bad coverage and that have overlapping handover area with neighbor cells can be tilted. In an embodiment, the analysis is performed based on signal level distribution. This analysis can be done separately for individual cells instead of trying to determine how much certain cell interferes with other cells. By performing analysis of antenna tilting based on performance data of individual cells, efficiency of analysis can be improved and antenna directions over the network can be improved over time.

Figure 1:
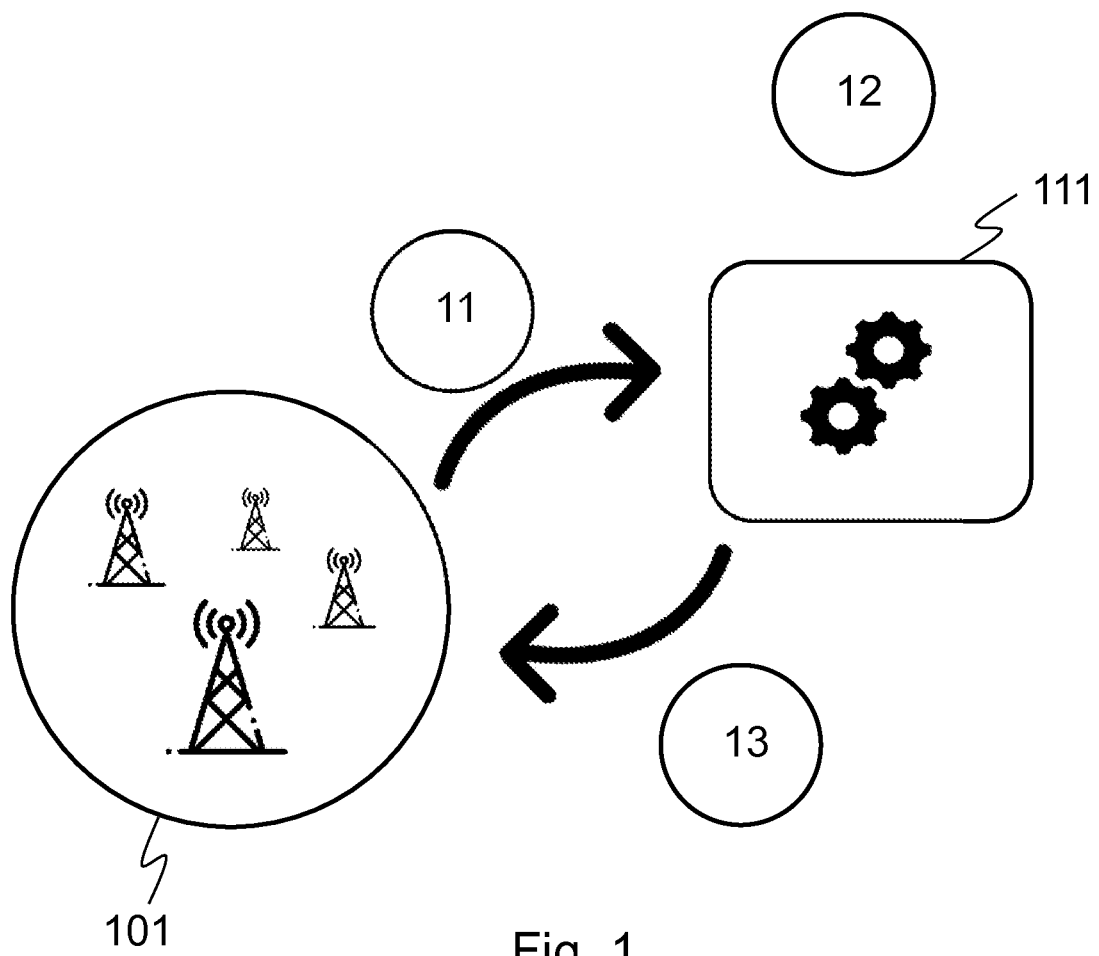
FIG. 1 shows an example scenario according to an embodiment.

FIG. 1 shows an example scenario according to an embodiment. The scenario shows a communication network 101 comprising a plurality of cells and base stations and other network devices, and an automation system 111 configured to implement (automatic) antenna tilting analysis according to example embodiments.

In an embodiment the scenario of FIG. 1 operates as follows: In phase 11, the automation system 111 collects performance data from cells of the network. The process may be manually or automatically triggered. Additionally or alternatively, the process may be periodically repeated. The process may be repeated for example once a day, every other day, every three days, once a week, every two weeks, once a month, or every two months. By periodically repeating the process, antenna tilts of the network gradually improve. Additionally or alternatively, periodic repeats provide that antenna tilts of the network adapt to changes in the network load and changes in usage patterns.

Performance data is collected for a predefined period of time to collect sufficient data for determining antenna tilt for one or more cells of the network. The predefined period of time may be for example 1-3 days, 1 week, 2 weeks, 3 weeks, one month, or some other period of time.

In phase 12, the automation system 111 uses the collected performance data to determine if antenna tilt can be or should be changed in the cells that are analysed.

In phase 13, the antenna tilts are changed in cells of the communication network 101 according to results of phase 12. Change in antenna tilt may refer to tilting the antenna down or up. Thereafter, the phases 11 and 12 may be repeated for the cells where antenna tilt was changed to confirm that the change that was made did not degrade performance and/or resulted in improved performance.

It is to be noted that although performance data is typically collected from a plurality of cells, antenna tilt analysis can be performed individually for each cell. In an embodiment multiple antenna tilt analysis is performed in parallel for multiple cells. In an embodiment, neighbor cells are excluded from parallel analysis though. That is, while a first cell is analysed, neighbor cells of the first cell are not analysed, but third cells that are not neighbors of the first cell can be analysed. In this way, simultaneous changes in antenna tilts of neighbor cells can be avoided.

Figure 2:
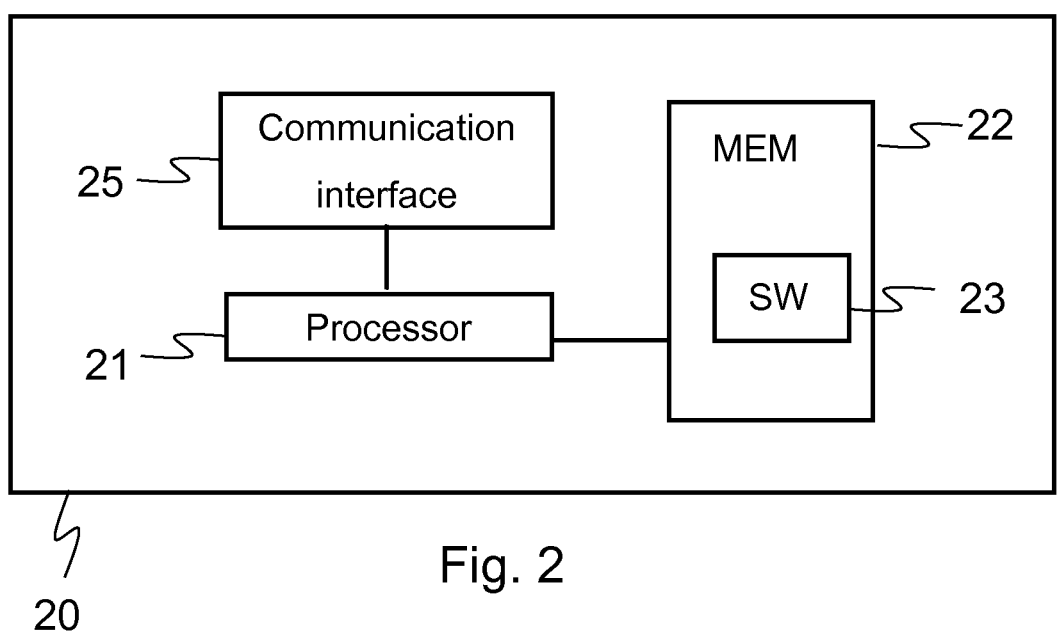
FIG. 2 shows an apparatus according to an embodiment.

FIG. 2 shows an apparatus 20 according to an embodiment. The apparatus 20 is for example a general-purpose computer or server or some other electronic data processing apparatus. The apparatus 20 can be used for implementing embodiments of the present disclosure. That is, with suitable configuration the apparatus 20 is suited for operating for example as the automation system 111 of foregoing disclosure.

The general structure of the apparatus 20 comprises a processor 21, and a memory 22 coupled to the processor 21. The apparatus 20 further comprises software 23 stored in the memory 22 and operable to be loaded into and executed in the processor 21. The software 23 may comprise one or more software modules and can be in the form of a computer program product. Further, the apparatus 20 comprises a communication interface 25 coupled to the processor 21.

The processor 21 may comprise, e.g., a central processing unit (CPU), a microprocessor, a digital signal processor (DSP), a graphics processing unit, or the like. FIG. 2 shows one processor 21, but the apparatus 20 may comprise a plurality of processors.

The memory 22 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 20 may comprise a plurality of memories.

The communication interface 25 may comprise communication modules that implement data transmission to and from the apparatus 20. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, LTE (Long Term Evolution) or 5G radio module. The wired interface may comprise such as Ethernet or universal serial bus (USB), for example. Further the apparatus 20 may comprise a user interface (not shown) for providing interaction with a user of the apparatus. The user interface may comprise a display and a keyboard, for example. The user interaction may be implemented through the communication interface 25, too.

A skilled person appreciates that in addition to the elements shown in FIG. 2, the apparatus 20 may comprise other elements, such as displays, as well as additional circuitry such as memory chips, application-specific integrated circuits (ASIC), other processing circuitry for specific purposes and the like. Further, it is noted that only one apparatus is shown in FIG. 2, but the embodiments of the present disclosure may equally be implemented in a cluster of shown apparatuses.

Figure 3A:
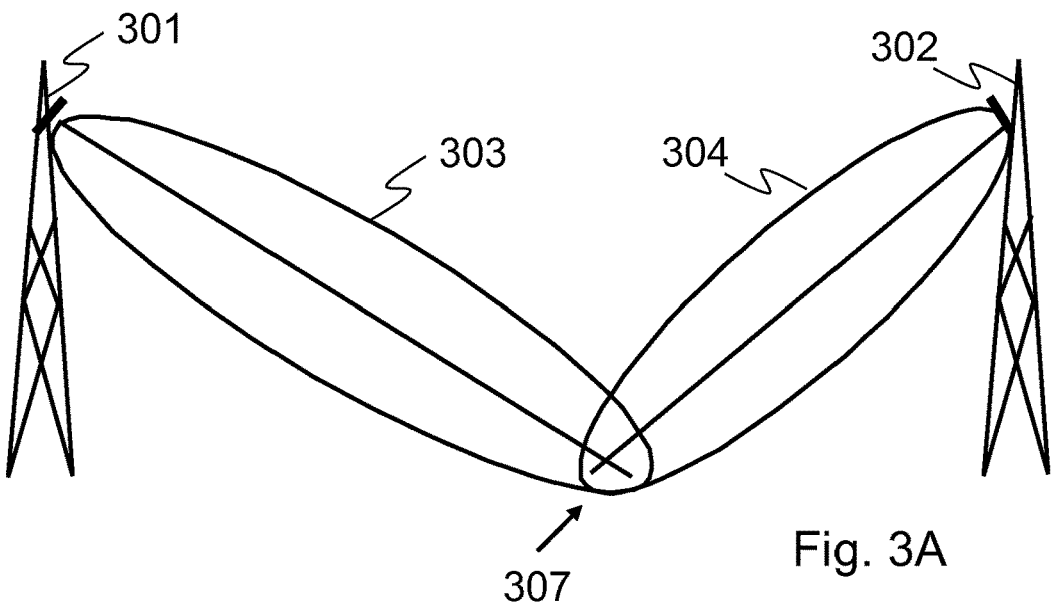
FIGS. 3A-3C illustrate certain aspects of antenna tilting.
Figure 3B:
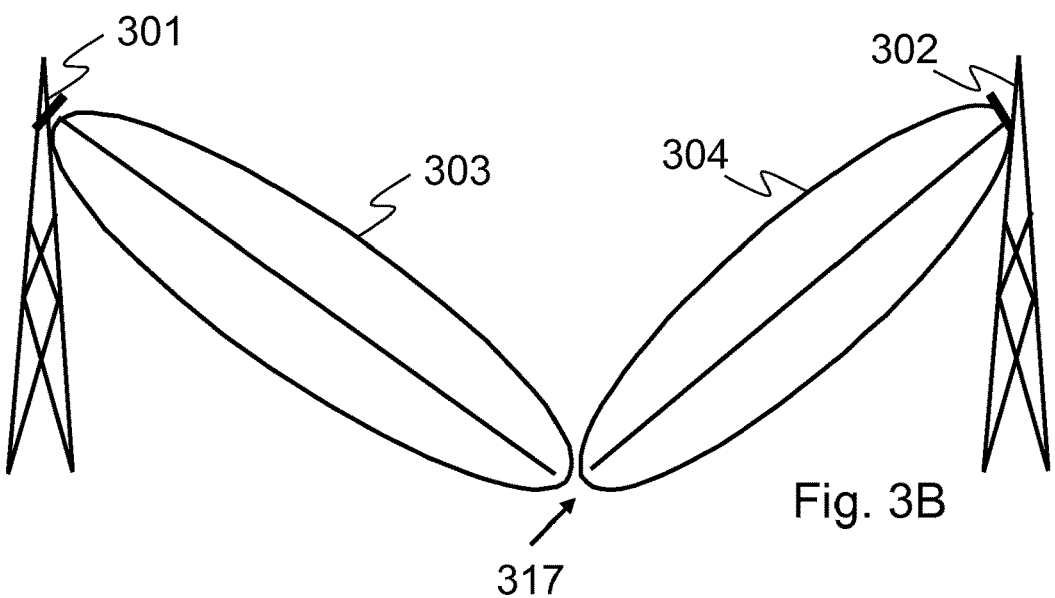
Figure 3C:
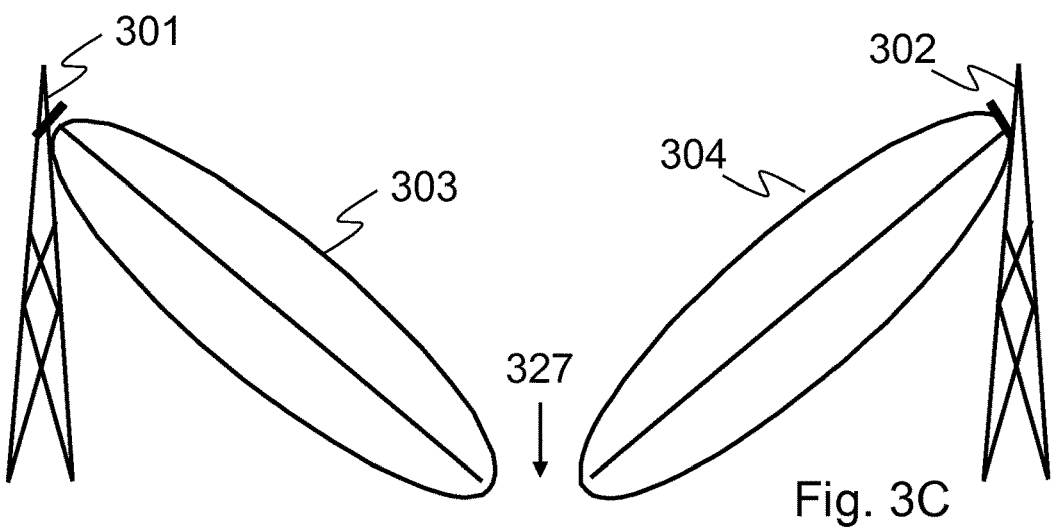

FIGS. 3A-3C illustrate certain aspects of antenna tilting. FIGS. 3A-3C show a first antenna 301 and first antenna beam 303 of a first cell, and a second antenna 302 and a second antenna beam 304 of a second cell. In FIG. 3A, the antenna beam 303 and the antenna beam 304 overlap in the area 307 causing interference as users in the area 307 receive significant signal level from both antennas 301 and 302. Now, if performance data of the first cell is analysed according to mechanisms of embodiment of the present disclosure, it is concluded that antenna 301 can be tilted down. FIG. 3B shows the situation after tilting down the antenna 301. In FIG. 3B, the antenna beams 303 and 304 meet at point 317, but there is no longer significant overlap in the beams. Thereby interference is reduced and performance improved. Any users moving from the area of the first cell to the second cell are handed over to the second cell in point 317.

FIG. 3C shows a situation where the first antenna 301 is tilted down even further. Now there is a gap 327 between the antenna beams 303 and 304 and the service is likely to degrade if there are any users in the area 327 as neither antenna 301 nor antenna 302 provide sufficient signal level in the area 327. In such case, is performance data of the first cell is analysed according to mechanisms of embodiment of the present disclosure, it is concluded that the change made in tilt of the antenna 301 should be reverted back to previous setting.

Figure 4:
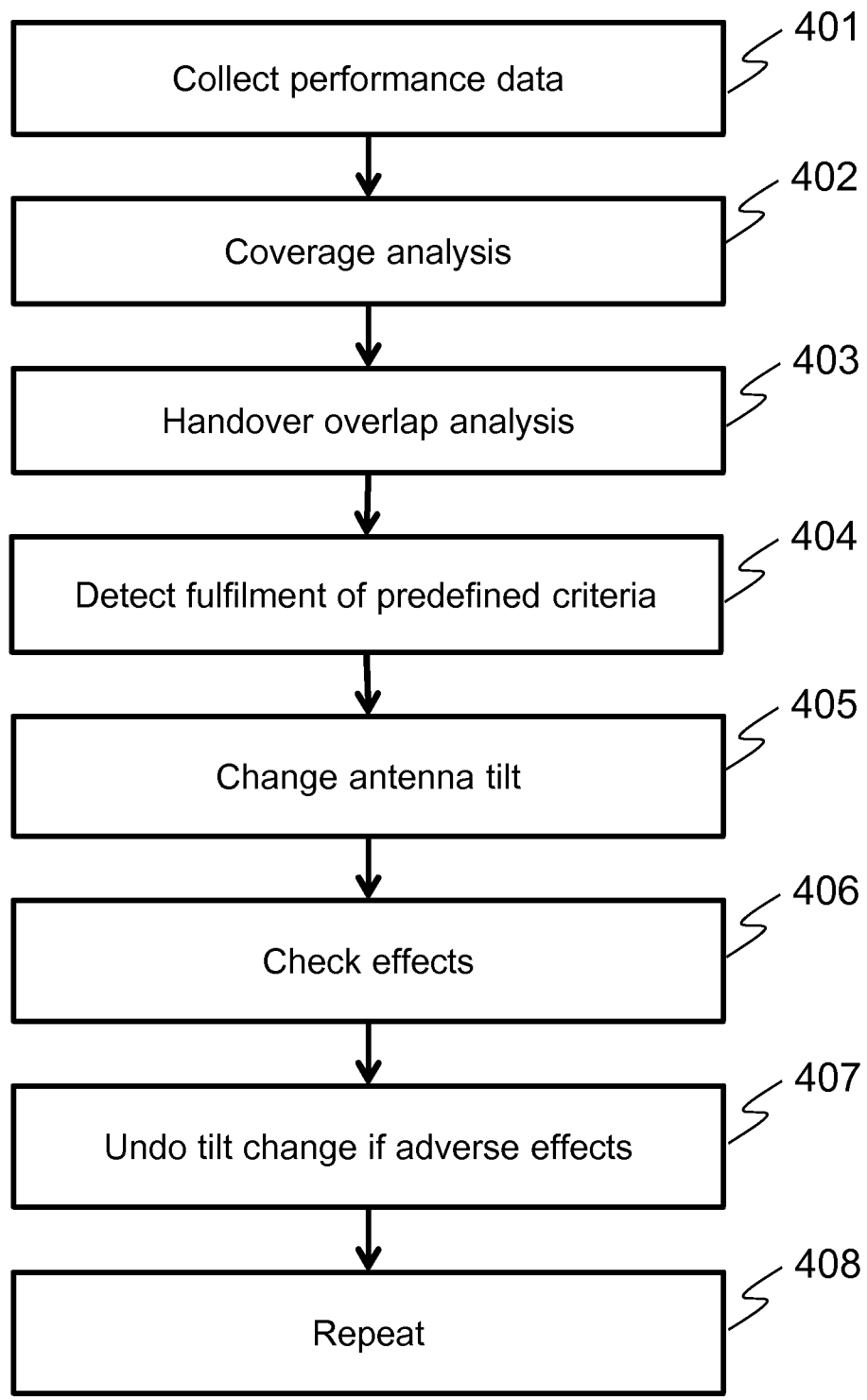
FIG. 4 shows a flow diagram illustrating example methods according to certain embodiments.

FIG. 4 shows a flow diagram illustrating example methods according to certain embodiments. The methods may be implemented in the automation system 111 of FIG. 1 and/or in the apparatus 20 of FIG. 2. The methods are implemented in a computer and do not require human interaction unless otherwise expressly stated. It is to be noted that the methods may however provide output that may be further processed by humans and/or the methods may require user input to start. Different phases shown in FIG. 4 may be combined with each other and the order of phases may be changed expect where otherwise explicitly defined. Furthermore, it is to be noted that performing all phases of the flow charts is not mandatory.

The method of FIG. 4 comprises following phases:

Phase 401: Performance data is collected from a cell. The performance data comprises at least signal level information.

Phase 402: Coverage analysis is performed. Number of bad coverage samples is determined based on the performance data. In an example embodiment, this refers to number of signal level samples below a certain signal level threshold.

Phase 403: Handover overlap analysis is performed. Value for a handover overlap parameter is determined based on the performance data. In an example embodiment, this refers to a value calculated based on number of signal level samples in a first range below and a second range above a handover threshold signal level value. The value may be based on difference between the number of signal level samples in the first range and the second range. The difference may be expressed in percentage. More specific examples of calculating the value for the handover overlap parameter are discussed later in this document.

Phase 404: It is detected that both the coverage analysis and the handover overlap analysis fulfil predetermined criteria, i.e. that the number of bad coverage samples and the value of the handover overlap parameter fulfil predetermined criteria. Responsively, instructions to change antenna tilt are output in phase 405. The change may be to tilt the antenna downwards or upwards. Antenna tilt according to the instructions may then be performed in the cell. In case the criteria are not fulfilled, antenna tilt is not instructed, and the process may repeat from the beginning at a later time.

In an embodiment, detecting fulfillment of the predetermined criteria is based on comparison to one or more thresholds. The thresholds may be different for different radio technologies. Depending on implementation details, values above or below thresholds may be required to fulfil the predetermined criteria. For example, it may be required that that the number of bad coverage samples is below a first threshold and that the value of the handover overlap parameter is above a second threshold. In an embodiment, the number of bad coverage samples being below the first threshold indicates that the cell does not suffer from bad coverage. In an embodiment, the value of the handover overlap parameter being above the second threshold indicates that the cell has overlapping handover area with neighbor cells.

The first threshold for the number of bad coverage samples may be for example 40-80. More specifically, the first threshold for the number of bad coverage samples may be for example 60-80 for GSM technology and 40-60 for LTE technology. In an example embodiment, the first threshold for the number of bad coverage samples is 70 for GSM technology and 50 for LTE technology.

The second threshold for the value of handover overlap parameter may be for example 85-95%. More specifically, the second threshold for the value of handover overlap parameter may be for example 85-90% for GSM technology and 90-99% for LTE technology. In an example embodiment, the second threshold the value of handover overlap parameter is 87% for GSM technology and 93% for LTE technology.

Phase 406: After the instructed change of antenna tilt has been performed, effects of the change are checked. This phase comprises collecting updated performance data, determining number of bad coverage samples based on the updated performance data, determining value for the handover overlap parameter based on the updated performance data, and checking if the number of bad coverage samples or the value of the handover overlap parameter fulfil the predetermined criteria.

If the criteria are fulfilled, it is concluded that the change was good, and the process may repeat from the beginning at a later time. If the criteria are not fulfilled, it is concluded that the change was not good, and antenna is reverted back to previous antenna tilt in phase 407. That is, the performed tilt change is undone if adverse effects are detected.

Phase 408: The process is periodically repeated to continuously adjust antenna tilts.

In an example embodiment, the value of the handover overlap parameter is calculated based on distribution of signal level samples in a range below and a range above a handover threshold signal level value. In an example embodiment, the value of the handover overlap parameter is calculated as (number of samples in a first signal level range−number of samples in a second signal level range)/number of samples in a first signal level range.

The first signal level range is above the handover threshold signal level value (i.e. comprises signal levels that are better than the handover threshold signal level value) and the second signal level range is below the handover threshold signal level value (i.e. comprises signal levels that are worse than the handover threshold signal level value.

In an example embodiment, the value of the handover overlap parameter for GSM technology is calculated as Sum(−86_level_samples+ . . . +−88_level_samples)−sum(−99_level_samples+ . . . +−97_level_samples)/sum(−88_level_samples+ . . . +−86_level_samples).

In an example embodiment, the value of the handover overlap parameter for LTE700 and LTE800 technologies is calculated as Sum(−106_level_samples+ . . . +−98level_samples)−sum(−118level_samples+ . . . +−110level_samples)/Sum(−106 level_samples . . . +−98level_samples).

In an example embodiment, the value of the handover overlap parameter for LTE1800 & LTE2100<E2600 technologies is calculated as Sum(−118 level_samples+ . . . +−114level_samples)−sum(−126level_samples+ . . . +122level_samples)/Sum(−118_level_samples+ . . . +−114level_samples).

Without in any way limiting the scope, interpretation, or application of the claims appearing below, a technical effect of one or more of the example embodiments disclosed herein is ability to dynamically tilt antennas in an efficient and adaptive manner. In this way, network performance may be improved.

Example embodiments are based on using performance data from one cell only. In a further example embodiment, it is possible to take into account also samples from neighbor cells. For example, coverage analysis in phases 402 and 406 may comprise checking that number of bad coverage samples fulfils the predefined criteria also in neighbor cells.

Another technical effect of one or more of the example embodiments disclosed herein is ability to analyse suitable changes in antenna tilts based on performance data from individual cells without requirement of determining interference values and without necessarily obtaining performance data from neighbor cells. Thereby the solution is easy to implement and reliable to follow.

Another technical effect of one or more of the example embodiments disclosed herein is improved determination of antenna tilts that dynamically adapts to usage patterns of the network.

Another technical effect of one or more of the example embodiments disclosed herein is that as actually experienced signal levels are used in determining changes in antenna tilts differences between different seasons can be seen and automatically taken into account. Still further, as number of bad coverage samples is monitored also coverage problems can be detected and responsively solved thereby improving network quality.

If desired, the different functions discussed herein may be performed in a different order and/or concurrently with each other. Furthermore, if desired, one or more of the before-described functions may be optional or may be combined.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the present disclosure as defined in the appended claims.

The invention claimed is:

1. A computer implemented method of antenna tilt analysis for a cell of a communication network, the method comprising
    collecting performance data from the cell,
    determining a number of bad coverage samples based on the performance data,
    determining a value for a handover overlap parameter based on the performance data,
wherein the handover overlap parameter is determined based on signal level distribution in the cell,
    detecting that the number of bad coverage samples and the value of the handover overlap parameter fulfil predetermined criteria, and
    responsively outputting instructions to change antenna tilt in the cell.

2. The method of claim 1, further comprising
    changing the antenna tilt in the cell according to the instructions,
    collecting updated performance data from the cell,
    determining a number of bad coverage samples based on the updated performance data,
    determining a value for the handover overlap parameter based on the updated performance data,
    detecting that the number of bad coverage samples or the value of the handover overlap parameter based on the updated performance data do not fulfil predetermined criteria, and
    reverting back to previous antenna tilt.

3. The method of claim 1, wherein detecting fulfillment of the predetermined criteria is based on detecting that the number of bad coverage samples indicates that the cell does not suffer from bad coverage and that the value of the handover overlap parameter indicates that the cell has overlapping handover area with at least one neighbor cell.

4. The method of claim 1, wherein detecting fulfillment of the predetermined criteria is based on comparison to one or more thresholds.

5. The method of claim 4, wherein a first threshold for the number of bad coverage samples is 40-80.

6. The method of claim 4, wherein a first threshold for the number of bad coverage samples is 70 for GSM technology and 50 for LTE technology.

7. The method of claim 4, wherein a second threshold for the value of handover overlap parameter is 85-95%.

8. The method of claim 4, wherein a second threshold for the value of handover overlap parameter is 87% for GSM technology and 93% for LTE technology.

9. The method of claim 1, wherein the antenna tilt analysis is performed individually for different cells.

10. The method of claim 1, further comprising periodically repeating the antenna tilt analysis.

11. The method of claim 1, wherein the value of the handover overlap parameter is calculated based on a number of samples in a first signal level range below and a number of samples in a second signal level range above a handover threshold signal level value.

12. The method of claim 11, wherein the value of the handover overlap parameter is a difference between the number of samples in the first range and the number of samples in the second range.

13. The method of claim 12, wherein the difference is expressed as a percentage.

14. An apparatus comprising
    a processor, and
    a memory including computer program code; the memory and the computer program code configured to, with the processor, cause the apparatus to perform
    collecting performance data from a cell,
    determining a number of bad coverage samples based on the performance data,
    determining a value for a handover overlap parameter based on the performance data, wherein the handover overlap parameter is determined based on signal level distribution in the cell,
    detecting that the number of bad coverage samples and the value of the handover overlap parameter fulfil predetermined criteria, and
    responsively outputting instructions to change antenna tilt in the cell.

15. A computer program product stored on a non-transitory memory medium, wherein the computer program product comprises computer executable program code which when executed by a processor causes an apparatus to perform
    collecting performance data from a cell,
    determining a number of bad coverage samples based on the performance data, determining a value for a handover overlap parameter based on the performance data, wherein the handover overlap parameter is determined based on signal level distribution in the cell, detecting that the number of bad coverage samples and the value of the handover overlap parameter fulfil predetermined criteria, and responsively outputting instructions to change antenna tilt in the cell.

16. The method of claim 4, wherein a first threshold for the number of bad coverage samples is 40-80 and a second threshold for the value of the handover overlap parameter is 85-95%.

17. The apparatus of claim 14, wherein detecting fulfillment of the predetermined criteria is based on detecting that the number of bad coverage samples indicates that the cell does not suffer from bad coverage and that the value of the handover overlap parameter indicates that the cell has overlapping handover area with at least one neighbor cell.

18. The apparatus of claim 14, wherein detecting fulfillment of the predetermined criteria is based on a comparison to one or more thresholds.

19. The method of claim 1, wherein determining the number of bad coverage samples and determining the value for the handover overlap parameter are based on performance data of a single individual cell.

20. The apparatus of claim 14, wherein determining the number of bad coverage samples and determining the value for the handover overlap parameter are based on performance data of a single individual cell.

\* \* \* \* \*